UNITED STATES PATENT OFFICE.

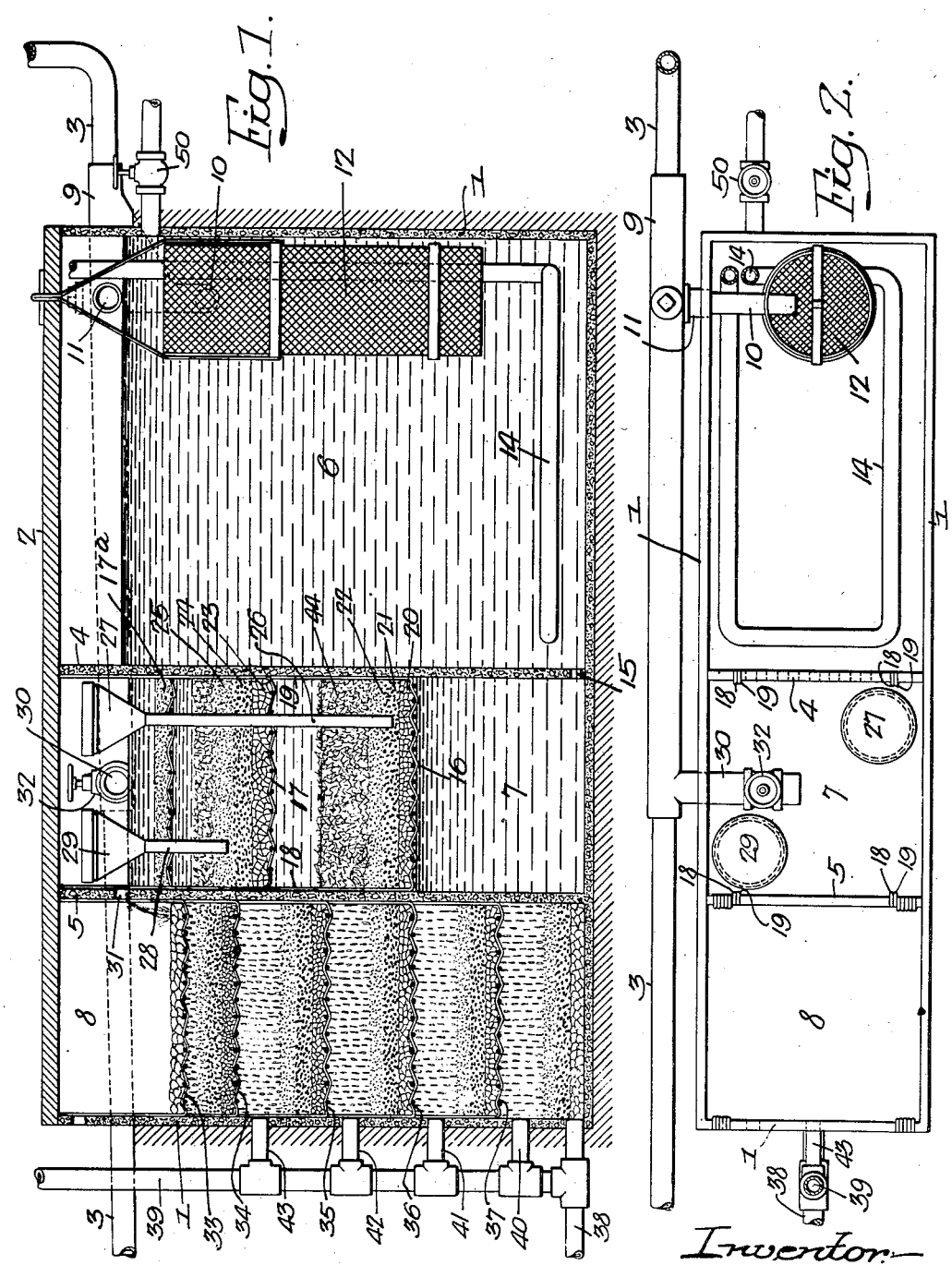

CHARLES G. DARRACH, OF PHILADELPHIA, PENNSYLVANIA, ASSIGNOR TO GRACE DARRACH, OF PHILADELPHIA, PENNSYLVANIA.

PROCESS AND APPARATUS FOR REDUCTION OF ORGANIC WASTE MATERIAL.

1,325,352.     Specification of Letters Patent.     Patented Dec. 16, 1919.

Application filed July 29, 1915. Serial No. 42,633.

*To all whom it may concern:*

Be it known that I, CHARLES G. DARRACH, a citizen of the United States, residing in Philadelphia, Pennsylvania, have invented novel Processes and Apparatus for Reduction of Organic Waste Material, of which the following is a specification.

One object of this invention is to provide a system of apparatus especially designed to treat organic waste material and particularly that of a household, with a view to bringing it to such a condition as will permit of its introduction into a sewage or other drainage system with beneficial rather than harmful results, or by a further treatment, fitting it for use as a potable water;—the invention contemplating such a process or series of operations as will bacteriologically and chemically decompose the material under treatment into gaseous, soluble and insoluble forms, together with the subsequent treatment of the resulting liquid with a view to bringing it to a potable condition.

A further object of the invention is to provide a process whereby kitchen wastes such as ordinary organic slop, together with the other organic household waste matter such as is commonly delivered to cess-pools or sewage systems, may be so operated on as to be changed into their liquid and gaseous constituents, the liquid being so treated as to be absolutely unobjectionable and being so completely freed from objectionable gases as well as organic matter as to be properly designated as potable.

The invention also contemplates an inexpensive and reliable apparatus for the reduction of organic material, which shall include a filtering medium to a large extent renewable by the operation of the apparatus itself; the arrangement of parts and the processes involved being such that the apparatus shall require but a minimum of attention and shall efficiently perform its functions while occupying but a minimum of space.

These objects and other advantageous ends I secure as hereinafter set forth, reference being had to the accompanying drawings, in which:

Figure 1 is a vertical section, to some extent diagrammatic, illustrating an apparatus in which my invention may be carried out and which itself constitutes part of said invention; and Fig. 2 is a plan of the apparatus shown in Fig. 1.

In the above drawings, 1 represents a tank or container set in the ground or in the cellar of a building and made of masonry such as concrete, or other suitable material such as wood or metal. This tank is provided with a removable cover 2 and has extending longitudinally along the upper part of one of its sides a pipe 3 having an inclination such as will cause a free flow of liquid and connected at its lower end to a sewer or drainage system. The upper end of said pipe is connected to receive not only the drainage from the ordinary soil pipe of a household drainage system, but also to have delivered to it the ordinary organic kitchen waste material commonly designated "slop," which it is to be noted, is finely comminuted or pulped before it is allowed to enter the pipe.

The tank as shown in Fig. 1, is divided by means of partitions 4 and 5 into three chambers, the first of which, formed by the partition 4 constitutes a digester 6 whose volume would be dependent partly upon the temperature of the fermenting organic matter within it; the partition 5 being so placed as to form the sterilizing and clarifying chamber 7, and the aerating compartment 8. The pipe 3 is provided with an intercepting device in the shape of a fitting 9 which is funnel shaped in vertical section and at its bottom leads to a lateral branch pipe 10 extending into the digester 6. From the upper part of this fitting a second branch 11 constituting an air vent, also extends into the same chamber; the arrangement being such that any gases escaping from the digester would pass into the soil pipe and thence to the ventilating pipe ordinarily connected thereto as required for the house drainage system.

The pipe 10 is designed to discharge into a wire basket or other perforated container 12 mounted within the digester 6 and so supported as to catch and hold any indecomposable matter which might accidentally enter the apparatus, as well as to break up or separate large bodies of organic material such as foecal matter.

The liquid in the digester is designed to be artificially heated by any suitable means such as a coil or pipe 14 forming part of the circuit of a hot-water heating system or which is attached to the water back of a range, or it may be heated by the direct admission of hot water, or be connected to receive the exhaust or drip from any form of steam actuated or heat driven device.

The digester 6 and the sterilizing tank 7 are connected by openings 15 of suitable number and such cross section that with a definite difference in level between the liquid in said chambers, the flow through them will occur at the rate of discharge for which the apparatus is designed to operate; that is to say, if the quantity of liquid entering the digester 6 is so great that these openings do not permit it to escape at the rate at which it is received, said liquid accumulates and is stored in the digester up to a predetermined level.

The sterilizer 7 has mounted in it a pair of horizontal perforated partitions 16 and 17 placed one above the other and removably suspended by hangers 18 and 19 from the top edges or upper parts of the partitions 4 and 5, though they may be supported on the sides of the apparatus in any other desired manner. On the lower of these horizontal perforated partitions 16 is placed, first, a body of comparatively coarse gravel or small stones 20, on this a layer of smaller material 21, and finally a layer of fine sand 22, while above this upper sand layer is carried a mass of neutral flock such as hydrated-sulfate of lime. The perforated horizontal partition 17 similarly carries a layer of coarse gravel or small stones 23, a layer of fine gravel 24, and a layer of sand 25, the latter being supported at such a level in the sterilizing chamber 7 that it is at a predetermined distance below the top surface of the liquid therein, the arrangement being such that no flock can be carried into the aerating chamber.

If desired or found necessary, a third sand barrier 17ᵃ may be mounted at a suitable distance above the sand layer 23 in order to prevent the escape of the flock which may be caused to rise by reason of the gas adhering to it.

For delivering a chemical reagent to this sand barrier 25 immediately under the flock, I provide in the sterilizing chamber a vertically extending conduit 26 leading thereto from a covered holder or hopper 27 and similarly provide a second conduit 28 having a covered hopper or holder 29 designed to deliver a chemical reagent to the sand barrier carried by the partition 17.

A valved outlet 30 leads from the upper part of the chamber 7 into the pipe 3 so that when the valve is open, the material rising in said chamber above a predetermined height may pass into said pipe.

The upper part of the partition 5 is provided with a passage or flow delivering edge constituting a weir 31, through or over which liquid passes from the sterilizing and clarifying chamber 7 into the chamber 8 when the valve 32 in the pipe 30 is closed. This latter chamber contains the aerating and purifying apparatus, being provided with a number of perforated horizontal partitions 33, 34, 35, 36 and 37, supported in any suitable manner and each carrying a layer of relatively coarse gravel or fine stone, a layer of finer gravel, and a layer of sand. In the present case I have shown the upper one of the partitions 33 as supporting a layer of coarse gravel or stone designed to spread or distribute over the aerators the water passing over the weir.

An outlet pipe 38 leads from the lowest portion of the chamber 8 to any desired point of delivery for purified water, and it has connected to it an air supply pipe in the form of a riser 39 which in turn is connected through branches 40, 41, 42 and 43 to the aerating spaces between the partitions 37, 36, 35 and 34 respectively, so as to deliver air thereto.

Under conditions of operation the digester 6 and the sterilizing and clarifying chamber 7 are filled with water at a temperature approximately 100° F., which temperature is maintained by a heating medium circulated through or supplied by the pipe 14 or otherwise as may be found convenient. A small quantity of yeast or other ferment is then placed in the digester and the surface of the water therein is covered with a layer of paraffin or heavy oil, preferably the former. Obviously the yeast may be omitted if desired, as may also the heating of the water in the digester, but in such case longer times are required for the proper and complete treatment of a given amount of organic waste material and consequently a larger apparatus is necessary in order to provide the same capacity of apparatus. The organic material to be treated, such as the household waste material previously specified, is delivered from time to time through the pipe 3 to the digester and undergoes fermentation therein, with the result that the solids are liquefied, while the fats, oils and certain of the lighter ingredients of the material treated, as well as those containing gas, rise to the top of said digester under the oil or paraffin layer, where they likewise are liquefied at a slower rate. If desired, certain of this accumulated material, such as the oil and fat, may be drawn off from time to time through a valved outlet 50 placed at a suitable point in the side of the digester chamber.

The gases of decomposition to a large extent are absorbed by the liquid in the digester 6 although if they should escape from said liquid through the paraffin seal, they pass into the pipe 3 and thence into the ventilating pipe connected therewith. Owing to the hydraulic head produced by the intermittent entrance of liquid to the digester, the liquid in the bottom thereof, highly charged with gases and other products of decomposition, passes through the small orifices 15 at the bottom of the partition 4 into the reservoir formed by the lower part of the sterilizing and clarifying chamber 7 below the flock filter.

The size and number of these orifices 15 are such that they regulate the flow from the digester to a predetermined amount dependent on the rate at which crude sewage is received and on the time required for its proper treatment. The liquid flowing up through the sterilizing and clarifying chamber 7 passes through the first sand barrier carried by the perforated partition 16, by which it is deprived of any undissolved particles of organic matter and where it is supplied with a salt such as chlorinated lime or chlorid of lime, delivered from the container 27 through the conduit 26, whereby the albumenoid ammonia is disintegrated and said liquid is impregnated with a solution of said salt. It is to be understood that the delivery of said compound from the container 27 may be regulated in any desired manner, the rate of its flow being determined by the composition and quantity of the liquid under treatment. The free chlorin from the lime salt not only disintegrates the albumenoid material carried by the rising liquid but acts to sterilize and deodorize it as well as the mass of flock 44, which is held between the first and second sand barriers. Any solid organic material carried up through the first sand barrier lodges in the mass 44 of the permanent flock where it also is sterilized and aids the action of the original filtering flock.

The resulting clear and sterile liquid now contains lime and certain dissolved gases, though it is practically free from atmospheric air, and as it continues to rise through the chamber 7, it passes through the second sand barrier on the partition 24 where it is treated with ferric sulfate delivered from the container 29 and conduit 28. The liquid is thus softened and so acted on that a secondary flock is formed, through which the flowing liquid is further filtered, being then delivered through the third sand barrier 17ª directly to the lower end of the pipe 3 through the valved branch 30 or when its further purification is desired, permitted to flow over the weir 31. The third sand barrier prevents the escape of the flock carried up by the gas produced from the decomposition of the albumenoid compounds though in some cases it may be omitted without departing from my invention. Under certain conditions the secondary flock tends to increase in volume owing to the continuous reaction of the salts of lime, and such surplus beyond the amount which it is desired to retain, passes off through the outlet 30.

As shown in Fig. 1, there is a body of air between each of the sand aerators in the chamber 8, so that the liquid covering each sand grain in a thin film is brought into most intimate contact with the air, which replaces the gases dissolved in said liquid and oxidizes any remaining organic material, with the result that the liquid finally drawn off through the pipe 38 is found to be completely purified and is in fact potable.

The air spaces interstratified with the sand beds expedites the aeration of the films of liquid adhering to the sand grains, and the slight depths of the sand beds (about one inch) prevents the retention of the liquid by capillary action which in the ordinary form of deeper sand beds is the cause of the great length of time required and the intermittent use practised. The sewage, when treated directly at the house, comes to the apparatus intermittently and consequently during the intermissions in the operation of said apparatus the sand beds drain practically dry.

From time to time the main cover may be removed together with the receiving basket 12 in order to permit of the removal of any undue accumulation of solid inorganic or undecomposable material therein. Obviously however this would be required only at long intervals and the construction and design of the holders 28 and 29 would be such that it would be but seldom necessary to renew the chemicals therein.

One important advantage of the above described construction resides in making the filters in the clarifying and sterilizing chamber so that any flocculent material moving up with the liquid from the bottom necessarily falls away from the underside of the sand barriers after each of the intermittent flows of liquid therein and so cannot choke them. Similarly the flock itself between the two sand barriers cannot pack or become clogged owing to the upward flow of the liquid passing through it.

Should it ever become necessary to clean the small sand beds in the chamber 8, this may be done by allowing said chamber to fill with water and reversing the direction of the current flow by opening the valve 32, whereupon accumulation of sediment on said beds will be raised by the water current entering through the pipe 38 (which is connected to a source from which water suitable for washing may be supplied) and with said water will flow out through the pipe 30 into the drain pipe 3.

I claim:

1. An apparatus consisting of a digester for organic material; and a clarifying apparatus connected to receive liquid from the bottom of said digester, said apparatus including a body of granular material supported in said tank between two bodies of liquid; and means for supplying a flock forming reagent direct to said material independently of said bodies of liquid.

2. The combination of a container having two partitions dividing it into a digester, a tank containing liquid clarifying means and a second tank containing means for aerating the liquid, the digester being connected at its bottom to the clarifying tank and the latter being connected at its top to the aerating tank; with a conduit connected to deliver organic waste material to the digester; with a connection to said conduit from the upper part of the clarifying tank.

3. The method of aerating liquid by relatively thin sand beds which consists in intermittently delivering such liquid to said beds in the presence of air; and permitting the beds to drain substantially dry between each delivery of liquid.

4. The combination of a digester for organic waste material; a filtering tank connected to receive at its lower portion liquid from the lower portion of said digester; a plurality of bodies of filtering material supported in said tank; means for supplying a sterilizing substance to the lower one of said bodies of filtering material; means for supplying a substance to the upper body of filtering material to remove the surplus sterilizing material; and an aerating chamber placed to receive liquid overflowing from the top of said filtering tank.

5. The combination of a digester for organic waste material; a tank connected to receive at its lower portion liquid discharged from the lower part of said digester; a plurality of bodies of filtering material spaced apart in said tank; a container for sterilizing material having a delivery pipe discharging into the lower one of said bodies of filtering material; a second container for a substance for removing surplus sterilizing material connected to deliver to the upper body of filtering material; and an aerating chamber connected to receive liquid discharged from the top of the tank.

CHARLES G. DARRACH.